Inventor
Frank Postma,
By J. Stanley Burch
Attorney

Patented July 25, 1939

2,167,312

UNITED STATES PATENT OFFICE 2,167,312

ABRADING ELEMENT

Frank Postma, Ridgewood, N. J.

Application November 5, 1937, Serial No. 173,013

2 Claims. (Cl. 51—204)

This invention relates to abrading elements, and has more particular reference to an improved abrading liner for the bearings of engine crankshafts, the abrading liner being more particularly of the type disclosed in my copending application Ser. No. 164,389, filed September 17, 1937.

As is well known in the art, the crankshaft bearings of certain engines are lined with bearing material which is exceedingly thin, and when this bearing material is removed there is insufficient clearance between the bearing and the crankshaft journal for accommodating an effective abrading liner. While this clearance may be increased at the top and bottom of the bearing by placing shim plates between the ends of the bearing sections, the clearance cannot be increased by adjustment at the sides of the bearing and the particular form of abrading liner shown in the aforesaid co-pending application cannot be used. It is accordingly an object of the present invention to provide an improved abrading liner suitable for use under the foregoing condition. In carrying out this object, I provide an abrading liner consisting of a pair of semi-cylindrical members composed of a thin outer shell of sheet metal or like relatively stiff and strong material adapted to seat against the bore of the bearing and having secured or bonded to its inner surface granular abrading material which is of effective thickness intermediate the ends of the abrading liner sections where proper clearance can be had by adjustment of the crankshaft bearing, said granular abrading material tapering thinner toward the ends of the abrading liner sections to correspond to the clearance which gradually decreases between the bearing and the crankshaft journal at the sides of the latter.

The shim plates interposed between the sections of the crankshaft bearing to provide the necessary clearance at the top and bottom of the latter are preferably in the form of apertured ears integral with the ends of the abrading liner sections, adapted to seat between the ends of the outer shell of the bearing sections and to receive the bolts which secure the bearing sections together, whereby the abrading liner sections are effectively held against turning with the crankshaft journal and relative to the crankshaft bearing during the abrading operation.

With the above objects in view, the present invention consists in the novel construction hereinafter more full described, shown in the accompanying drawing and claims.

Figure 1:
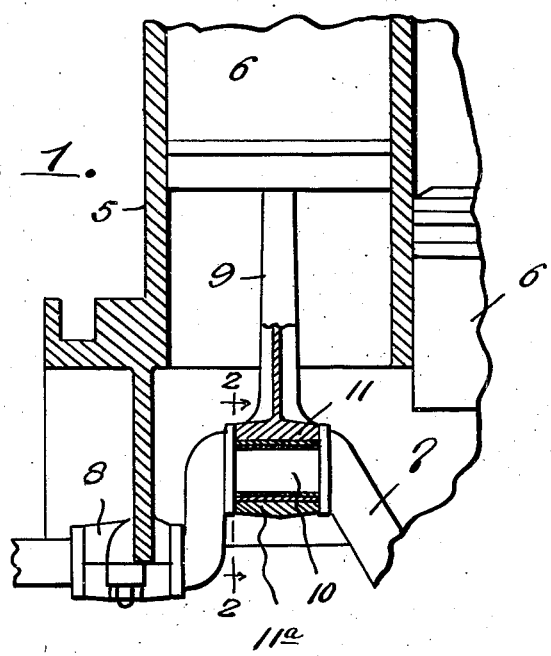
Figure 1 is a fragmentary sectional view showing an engine connecting rod bearing provided with an abrading liner embodying the present invention.
Figure 2:
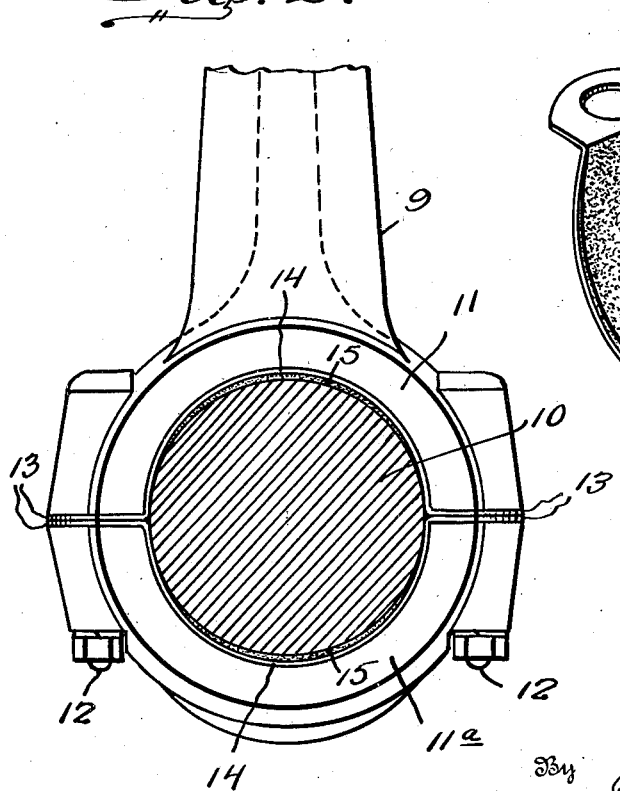
Figure 2 is an enlarged fragmentary section taken on line 2—2 of Figure 1.
Figure 3:
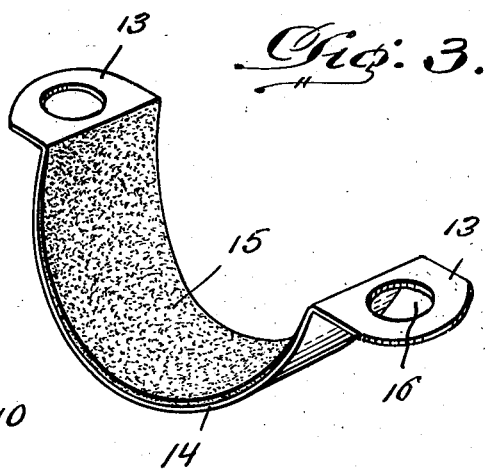
Figure 3 is an enlarged perspective view of one of the sections of the abrading liner employed in Figures 1 and 2.

Referring in detail to the drawing, 5 indicates an engine cylinder block having pistons 6 reciprocable in the cylinders thereof. As usual, the engine crankshaft 7 has a plurality of spaced journals mounted in bearings of the engine block 5, one of which bearings is indicated at 8. Also, the cranks of said crankshaft have journals engaged in bearings provided on the lower ends of the connecting rods to the upper ends of which the pistons 6 are attached, one of the connecting rods being shown at 9 with the crankshaft journal 10 engaged in the bearing provided on the lower end of said connecting rod. The bearing of connecting rod 10 includes the usual half bearing or bearing block 11 integral with the lower end of connecting rod 9, and the separate half bearing or bearing cap 11a detachably bolted as at 12 to the bearing block 11. The bearing 11, 11a is of that type provided with a lining of unusually thin bearing material which, when removed, leaves insufficient space or clearance between said bearing and the crankshaft journal 10 for accommodating an effective abrading liner when the bearing cap 11a is bolted to the bearing block 11 with their ends in contacting relation as in the normal use of the bearing. In order to provide sufficient clearance between the bearing 11, 11a and the crankshaft journal 10 to accommodate an effective abrading liner, it is necessary to provide shim plates 13 between the ends of the bearing block 11 and bearing cap 11a, but this increases the clearance only at the top and bottom of the bearing and not at the sides thereof. It is therefore necessary to provide abrading liner sections whose abrading material is of effective thickness intermediate their ends but which gradually decreases in thickness toward their ends. I accordingly provide an abrading liner consisting of a pair of semi-cylindrical members, each composed of a thin outer shell 14 adapted to seat against the bore of the bearing section with which it is associated, and having secured or bonded to its inner surface granular abrading material 15 which bears upon the crankshaft journal, the abrading material 15 being of effective thickness intermediate the ends of the abrading liner section and gradually tapering thinner toward the ends of said section as shown clearly in Figures 2 and 3. These abrading liner sections are of the same width or length as the bearing and are seated in contacting relation with each other at their end or longitudinal edges. Suitable means is provided to assure retention of the abrading liner sections in the correct positions with respect to each other and the bearing, and to hold them against turning with the crankshaft journal. Such means may consist of the shim plates 13 by forming the latter integral with the ends of the backing or outer shell 14 of each abrading liner section, said shim plates having openings 16 to accommodate the bolts at 12 of the means for securing the bearing sections together. In this way, the abrading liner sections are effectively held properly in place and against turning with the crankshaft journal, the thin outer shell 14 of each abrading liner section being constructed or relatively stiff and strong material such as sheet metal.

The present abrading liner is used by simply placing the same in the bearing and securing them in such bearing with the bolts 12 extending through the openings 6 of the shim plates 13, the latter being disposed between the ends of the bearing sections. When the abrading liners are thus secured in place, the crankshaft 7 is rotated so as to subject the journal 10 to the abrading action of the abrading liner as generally described in my above-mentioned co-pending application.

What I claim as new is:

1. As a new article of manufacture, an abrading liner for abrading the journal of an engine crankshaft bearing, consisting of a pair of semi-cylindrical members adapted to be accommodated in the limited clearance space between the actual crankshaft bearing and the crankshaft journal of the engine and to seat against the bore of the bearing, each of said semi-cylindrical members being composed of a thin outer shell of relatively stiff and strong sheet material having granular abrading material bonded to its inner surface, the abrading material of each abrading liner member being of effective thickness intermediate the ends of its outer shell and gradually decreasing in thickness toward the ends of the latter.

2. As a new article of manufacture, an abrading liner for abrading the journal of an engine crankshaft bearing, consisting of a pair of semi-cylindrical members adapted to be accommodated in the limited clearance space between the actual crankshaft bearing and the crankshaft journal of the engine and to seat against the bore of the bearing, each of said semi-cylindrical members being composed of a thin outer shell of relatively stiff and strong sheet material having granular abrading material bonded to its inner surface, the abrading material of each abrading liner member being of effective thickness intermediate the ends of its outer shell and gradually decreasing in thickness toward the ends of the latter, and lateral shim plates integral with the ends of the outer shell of each abrading liner member and apertured for reception of the bolts which secure the crankshaft bearing sections together.

FRANK POSTMA.